United States Patent
Jeong

(10) Patent No.: US 6,243,226 B1
(45) Date of Patent: Jun. 5, 2001

(54) APPARATUS AND METHOD FOR DIGITAL SERVOCONTROL IN A DATA STORAGE SYSTEM USING DISK RECORDING MEDIA

(75) Inventor: Myung-Chan Jeong, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 08/343,939

(22) Filed: Nov. 17, 1994

(30) Foreign Application Priority Data

Nov. 27, 1993 (KR) .................................................. 93-25500

(51) Int. Cl.[7] .................................................. G11B 5/596
(52) U.S. Cl. .................................... 360/78.07; 360/78.09; 360/77.02; 369/44.29
(58) Field of Search ............................. 360/77.04, 77.06, 360/78.04, 78.07, 78.09, 78.12, 77.05, 77.02, 61; 369/43, 44.11, 44.29, 44.28, 44.35, 44.27; 318/561

(56) References Cited

U.S. PATENT DOCUMENTS

| | | | |
|---|---|---|---|
| 4,679,103 | 7/1987 | Workman | 360/78.07 |
| 4,697,127 | 9/1987 | Stich | 318/561 |
| 4,835,633 | 5/1989 | Edel | 360/78.12 |
| 4,894,599 | * 1/1990 | Ottesen et al. . | |
| 4,914,644 | 4/1990 | Chen | 369/43 |
| 4,920,462 | 4/1990 | Couse | 360/78.04 |
| 4,954,907 | 9/1990 | Takita | 360/70.01 |
| 4,980,876 | 12/1990 | Abate | 369/44.11 |
| 5,040,084 | 8/1991 | Liu | 360/77.04 |
| 5,051,851 | 9/1991 | Sakurai | 360/77.06 |
| 5,126,897 | 6/1992 | Ogawa | 360/78.09 |
| 5,164,931 | 11/1992 | Yamaguchi | 369/44.29 |
| 5,182,684 | 1/1993 | Thomas | 360/78.09 |
| 5,199,017 | * 3/1993 | Kagami et al. | 369/44.28 |
| 5,280,603 | * 1/1994 | Jeppson et al. | 360/69 |
| 5,305,160 | * 4/1994 | Funches et al. | 360/78.07 |
| 5,369,345 | * 11/1994 | Phan et al. . | |

FOREIGN PATENT DOCUMENTS

0470400A2  2/1992  (EP) .............................. G11B/5/596

* cited by examiner

Primary Examiner—Andrew L. Sniezek
(74) Attorney, Agent, or Firm—Robert E. Bushnell, Esq.

(57) ABSTRACT

The present invention relates to a servo control apparatus of a disk recording system and particularly to a servo control apparatus and method which are capable of controlling position of a head for recording digital data on a disk as recording media and reading the digital data. A digital servo control method for controlling a head driver for moving a head for reading servo information to a target track every a predetermined sampling period in a data storage system using disk recording media including the servo information indicating a divisional position of a recording area comprises the steps of detecting a current track position of the head in a current sampling period by determining information on a head position on a disk from the servo information, determining the current track position, an estimated speed in the next sampling period for moving to the target track by a control signal inputted in the head driver so that the head can be moved to the current track position, and an estimated position track of the head in the next sampling period, calculating a track interval between the target track and the estimated position track, and a target speed to move the head in correspondence with the interval, and calculating a difference value between the target speed and the estimated speed to thereby output a control signal corresponding to the difference value to the head driver.

18 Claims, 10 Drawing Sheets

APPARATUS AND METHOD FOR DIGITAL SERVOCONTROL IN A DATA STORAGE SYSTEM USING DISK RECORDING MEDIA

CROSS-REFERENCE TO RELATED APPLICATIONS

This application makes reference to, incorporates herein and claims all benefits occurring under 35 U.S.C. §119 from our application earlier filed in the Korean Industrial Property Office on Nov. 27, 1993 of our application entitled DIGITAL SERVO CONTROL APPARATUS AND METHOD OF DATA STORAGE SYSTEM USING DISK RECORDING MEDIA, which application was duly assigned Serial No.: 25500/1993. BACKGROUND OF THE INVENTION The present invention relates to a servo control apparatus of a disk recording system and particularly to a servo control apparatus and process capable of controlling the position of a head for recording and reading digital data on a disk as recording media.

In a current disk recording system, a hard disk drive (hereinafter referred to as HDD) operates in two modes, in accordance with the moving distance, the first of which is called a seek mode, in which a head moves between tracks so as to reach target position, and the second of which is called a track following mode, in which the head is accurately positioned on a data line of the track after the head has reached the target track.

In a method for controlling the position of the head in a hard disk drive, the control of velocity is executed until the head reaches a target position and the control of position is executed at the target position, so that the head lies on the track.

In a typical hard disk drive, the seek mode executes a search mode in the first deceleration phase and executes a transition mode in the second deceleration phase. Therefore, the seek mode is separated into the search mode and transition mode, in which servo information having the course of feedback uses a track number with a gray code. In the track following mode however, servo information uses a position error signal (hereinafter referred to as PES) using A and B bursts.

In such a conventional control method for respective seek (and its search and transition modes) and track following modes, a compensator or a proportional integral derivative controller has been frequently used. A voice coil motor controls the position of head in the disk recording system.

The conventional servo control apparatus may be an analog control apparatus depending upon the hardware to be controlled, or a mixed analog and digital mixing control apparatus. First, the head reads the number of the track in which the head is positioned currently through the gray code value indicating the servo information of track for each sampling period. As a result, the moving distance by which the head should be moved from a current position to a target position is defined. Target velocity corresponding to the moving distance is obtained from a look-up table. When the moving distance is defined, the seek mode is also determined. A real velocity is, however, determined by the difference between the value prior to sampling and current sampling value of the current position. Therefore, in the seek mode being separated as the search mode and transition mode, the control of velocity is executed by a control input derived from the target velocity and real velocity.

The conventional servo control apparatus as discussed above however, has the following problems which should be cleared. First, the real velocity is calculated for each sampling interval. The value calculated tends to be come more inaccurate however, where the sampling interval is short and the real position has changed substantially. Thus, there is a problem when the voice coil motor is required to execute an unexpected or abnormal movement in the search mode the head during the search mode or the transition mode.

Secondly, the track following mode which has a full state feedback which uses position information (a number of track, PES) and velocity information containing expectable errors, has great difficulties in maintaining the complete control due to instability of the real velocity information.

Third, it is possible that a steady state error will occur during the track following mode because there is no method for directly removing an external disturbance. While such an error is capable of being indirectly controlled by using an integral controller, but is not capable of being controlled over the whole range of data on the recording media, so that the error is not completely removed.

U.S. Pat. No. 5,182,684, to Thomas et al. for an *Estimator Positioning System And Method,* endeavors to control the movement of a head of a disk file by generating a position signal in response to servo information read. The current position signal is sampled regularly, and together with a current actuator control signal, updates estimated velocity. The distance from the current position to a specified position, i.e., distance-to-go, is also updated regularly. When the distance-to-go is greater than seven tracks the control signal is generated according to a maximum velocity of the actuator. When a maximum velocity is reached the system switches to a coast mode or when the number of tracks is less than or equal to seven tracks the system switches to a deceleration phase. During the deceleration phase the actuator control signal is generated by squaring the estimated velocity and dividing the result by the distance-to-go. Thomas et al. also suggests using an estimated position instead of the actual current position signal. In practice, only the position information is calculated and is used to modify the distance-to-go at each sampling period. The deceleration phase is followed by a track-following mode when the distance-to-go is between 1.0 and 0.125 tracks, i.e., less than 0.25 tracks.

U.S. Pat. No. 5,164,931, to Yamaguchi et al. for a *Method And Apparatus For Control Of Positioning,* uses a system for controlling positioning of a recording/playback head. The head is initially controlled as a velocity control system wherein a target velocity is generated in response to a track number signal. The difference between the head velocity and the target velocity is determined and the difference is supplied to a power amplifier for controlling the actuator for the heads. When the head reaches the vicinity of a target position, the head is controlled as a position control system utilizing the values of the target position and the position error signal of the current position of the heads.

U.S. Pat. No. 5,126,897, to Ogawa et al. for a *Magnetic Recording/Reproducing Apparatus Capable Of Reducing A Setting Time In A Head Positioning Control Mode,* for a servo type magnetic head drive control device with the moving velocity of the head controlled according to the moving distance to a target position in response to servo data and target velocity data. The servo data is used to generated position information and velocity information. Using the position information and target position information for calculating a moving distance, target velocity information is generated, in accordance with the moving distance. The velocity of the head is controlled for moving the head to a predetermined position on the basis of the difference between the velocity information and the target velocity information. After a certain time period or when a predetermined position is reached, control of the head movement is changed to be dependent upon a central processing unit (CPU) for operating in a positioning control mode having reduced settling time. In the position control mode, the CPU detects the position of the head actuator/driver using the position error signal (PES) from a head position decoder. The velocity signal, generated in response to the position error signal, is also detected by the CPU. The CPU then uses the position error signal and the velocity signal to control the positioning of the head. Use of a velocity estimated by the CPU in the position control mode is also discussed, by using a control model predefined in the CPU.

U.S. Pat. No. 5,051,851, to Sakurai for a *Method And Apparatus For Positioning Head On The Basis Of Premeasured Amount Of Displacement*, describes an apparatus having a plurality of disk-dependent displacement data stored in a table. The apparatus detects the displacement of a head from a designated track of a magnetic disk and controls the positioning of the head in a radial direction in response to disk-dependent displacement data from the table according to the designated track and further in response to the detected head displacement.

U.S. Pat. No. 5,040,084, to Liu for *Disk Drive system And Method*, provides servo tracks on a magnetic disk and storing position data of each servo track in memory by measuring the servo signal on each track.

U.S. Pat. No. 4,980,876, to Abate et al., for a *Single Stage Track Seek Method*, uses a seek method which remains in a positioning mode throughout the seek process. In the seek process the sinusoidal position error signal of the head relative to a track center is utilized and compared to an ideal profile stored in a look-up table. The head is moved on the basis of the difference between the ideal profile and the actual position.

U.S. Pat. No. 4,954,907, to Takita for a *Head Positioning Control Method And System*, mentions controlling head movement based on a new measured head position, a new measured head velocity, the previously measured head velocity, the previously computed actuator control signal, and predetermined stored constants when generating a new actuator control signal.

U.S. Pat. No. 4,920,462, to Couse et al. for a *Disc Drive Fine Servo Velocity Control And Method For Head Positioning Relative To A Disc*, uses servo velocity control circuitry for positioning a head on a destination track, and servo position control circuitry for centering the head in the destination track. The system uses the track identifying Gray code detected on the disc for moving the head to a track near the destination track under control of the servo velocity control circuitry, and uses the position error signal calculated in response to the detected servo data on the disc for centering the head on the destination track.

U.S. Pat. No. 4,914,644, to Chen et al., a *Disk File Digital Servo Control System With Coil Current Modeling*, provides long seek mode, i.e., moving a head from track to track, and a short seek mode, i.e., a track following mode. During initialization a state estimator in a microprocessor provides four estimated values, i.e., estimated head position, estimated head velocity, estimated voice coil motor current and windage (a bias force compensation current). Following initialization a digitizing PES channel provides primary and quadrature position error signals to the microprocessor, which in turn computes the actual position of the head and an estimator error is calculated based on the difference between a predicted head position and the actual head position. Next, the microprocessor computes a velocity error signal and compares this velocity error signal to a predetermined threshold. The estimated head position and estimated head velocity are computed based on the estimator error, a predicted head position and a predicted head velocity. The control signal is function of velocity error signal, and the estimated head acceleration. Following the output of the control signal the predicted variables are updated. The control signal is converted to analog form and provided to an integrated power amplifier. The voice coil motor current output by the integrated power amplifier is feed back and summed with the analog control signal.

U.S. Pat. No. 4,835,633, to Edel et al. for a *Disk File Digital Servo Control System With Compensation For Variation In Actuator Acceleration Factor*, stores information about the head velocity, coil current, and PES sampling times, and uses the stored information to calculate, an acceleration factor for generating a digital control signal which is utilized to control movement of the head.

U.S. Pat. No. 4,697,127, to Stich et al., an *Adaptive Control Technique For A Dynamic System*, controls a voice coil motor in a seek mode and track follow mode, wherein the seek mode is performed until the position of the head is within a quarter track of the target track, at which time the track following mode is performed. In the seek mode a microprocessor uses position information and an estimated velocity to produce a control signal for generating the coil current used in controlling the voice coil motor. The position error signal and the known coil current are used to generate an estimated bias and the estimated velocity, wherein the estimated bias is used within the estimator to correct the velocity estimate. In the track follow mode the microprocessor combines position, integrated position and estimated velocity signals to produce a composite signal which represents the magnitude to be applied to the actuator voice coil.

U.S. Pat. No. 4,679,103, to Workman, for a *Digital Servo Control System For A Data Recording Disk File*, has a digital servo system which receives a digital head position error signal and a digital signal corresponding to the head actuator input signal, and outputs a digital control signal. The digital control signal is converted to an analog signal, integrated and amplified to produce the head actuator input signal. The control signal is calculated from estimated head position values, estimated velocity and an estimated actuator input signal required to compensate for bias forces. The estimated values are functions of respective predicted values.

The present invention has an advantage over the noted prior art discuses above by using a previous control signal, a plurality of prediction estimates, a table of target values and units of different measure in each of three modes of operation for achieving stabilized settling of the head on the target track.

The transition mode is executed prior to about sixteen tracks from the target position, and upon reaching the target position, the advance speed of the head becomes lower. Although the seeking time becomes longer, the transition mode is executed for the purpose of stabilize settling the head. However, the conventional transition mode recognizes the current position of the head using the gray code and executes the control of velocity with only track position information using the gray code, so that an accurate control can not be executed during the performance of the transition mode and a bad influence can be effected on settling the track following mode.

SUMMARY OF THE INVENTION

It is therefore one object of the present invention to provide an improved servo control apparatus.

It is a digital servo control apparatus for differentially controlling the movement of head in accordance with the changes of operating modes.

It is another object to provide a digital servo control for executing the servo control for an external disturbance.

It is another object invention to provide a digital servo control method for differentially controlling the movement of head in accordance with the changes of operating modes.

These and other objects may be achieved with one embodiment of the digital servo control system and method for controlling a head driver for moving a head for reading servo information to a target track every a predetermined sampling period in a data storage system using disk recording media including the servo information indicating a divisional position of a recording area detects a current track position of the head in a current sampling period by determining information of a head position on a disk from the servo information, determines the current track position, an estimated speed in the next sampling period for moving to the target track by a control signal inputted in the head driver so that the head can be moved to the current track position, and an estimated position track of the head in the next sampling period, calculates a track interval between the target track and the estimated position track, and a target speed to moves the head in correspondence with the interval, and calculates a difference value between the target speed and the estimated speed to output a control signal corresponding to the difference value to the head driver.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
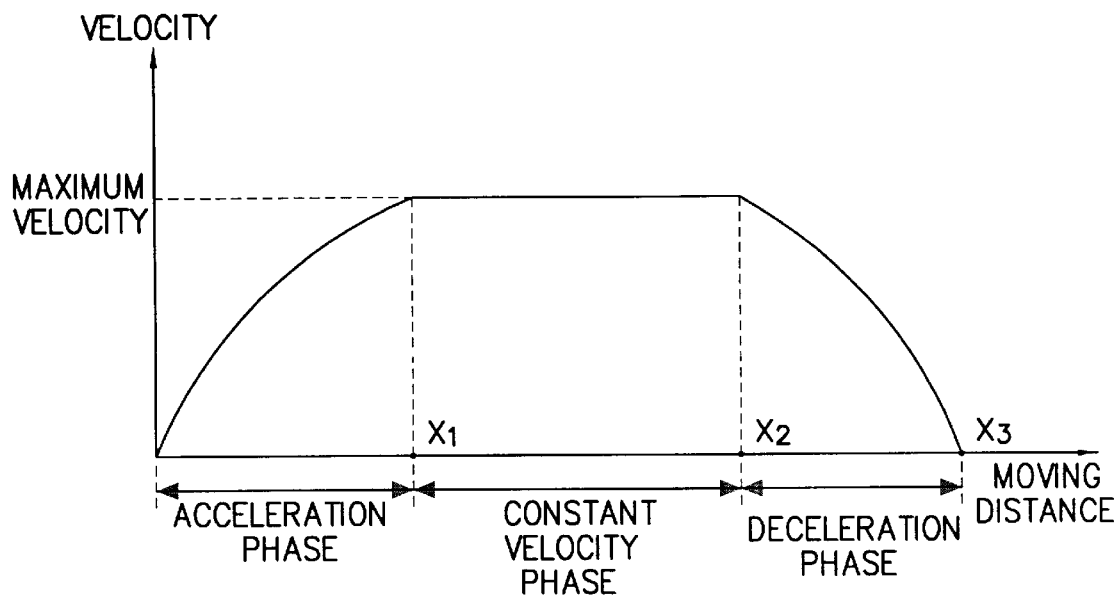
FIG. 1 is a graph showing head moving velocity corresponding to a track moving distance in a contemporary version of hard disk drive.

Turning now to the drawings, FIG. 1 is a graph showing head moving velocity corresponding to a track moving distance in a general HDD. The phase from zero to X1 represents an acceleration phase, the phase from X1 to X2 represents a constant velocity phase, the phase from X2 to X3 represents a deceleration phase, and X3 represents a target position.

Figure 2:
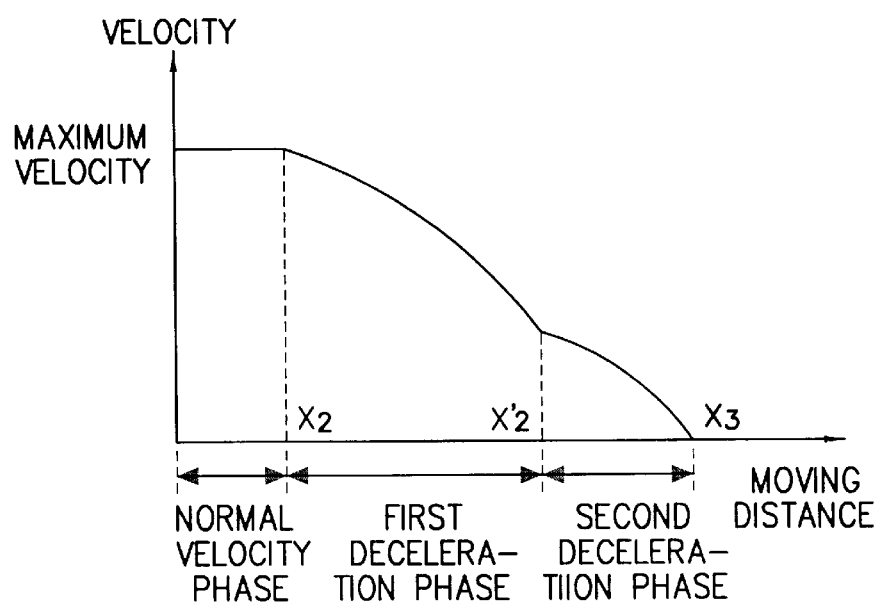
FIG. 2 is a graph in detail showing head moving velocity in the acceleration phase of the drive represented in FIG. 1.

FIG. 2 is a graph showing in detail showing the head moving velocity in the deceleration phase from X2 to X3 of FIG. 1, in which the phase from X2 to X2' represents a first deceleration phase and the phase from X2' to X3 represents a second deceleration phase. The seek mode mentioned above means an executing mode in the deceleration phase from X2 to X3, as shown in FIG. 1. As shown in FIG. 2, the seek mode executes a search mode in the first deceleration phase and executes a transition mode in the second deceleration phase. Therefore, the seek mode is separated into the search mode and transition mode, in which servo information having the course of feedback uses a track number using a gray code. In the track following mode, servo information uses a position error signal (hereinafter referred to as PES) using A and B bursts.

In the seek and track following respective modes of a conventional control process, a compensator or a proportional integral derivative controller has been usually used.

Figure 3:
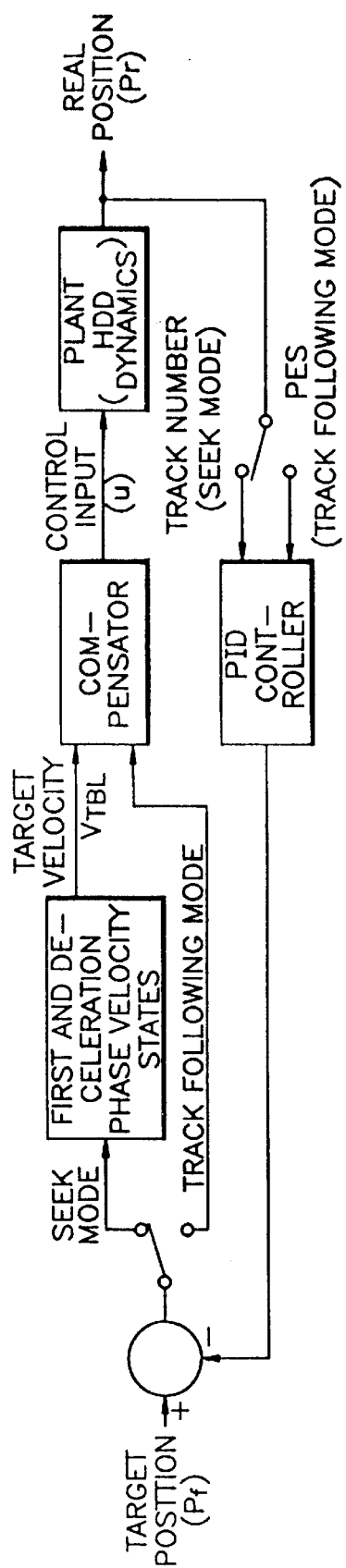
FIG. 3 is a block diagram showing a control system of a conventional servo control apparatus for controlling the position of a head while reading and writing digital data in a recording system using disk recording media.

FIG. 3 is a block diagram showing a control system of a conventional servo control apparatus for controlling the position of head with regard to reading and writing digital data in a recording system using disk recording media. Here, the term "plant" represents a voice coil motor (hereinafter referred to as VCM) which controls the position of head in the disk recording system. The target velocity value in the deceleration phase by the servo system of FIG. 3 is obtained by the following equation (1):

$$V_{TBL}=K(P_f-P_r)^\alpha \qquad (1)$$

where $V_{TBL}$ represents target velocity, $P_f$ target position, $P_r$ current position, and K proportional constant. Proportional constant K is defined depending upon the acceleration capability of the VCM, and an exponent a is generally used within the range from 0.5 to 1. The target velocity value calculated by the equation (1) above is stored in the ROM (not shown) as the velocity value in a look-up table. Explanation for the conventional servo control apparatus will be described in detail with reference to FIG. 3.

Depending upon the particular hardware to be controlled, a conventional servo control apparatus may be an analog control apparatus or a mixed analog and digital mixing control apparatus. First, the head reads the number of the track in which the head is positioned currently through the gray code value indicating the servo information of track every sampling period.

As a result, the moving distance X which should be moved from a current position $P_r$ to a target position $P_f$ becomes defined. At this time, the moving distance X is given by the following equation (2):

$$X = P_f - P_r \quad (2)$$

Thereafter, target velocity $V_{TBL}$ corresponding to the moving distance X is obtained from the look-up table. Further, when the moving distance X is defined, the seek mode is also determined.

A real velocity $V_r$ is, however, determined by the difference between the value prior to sampling and current sampling value of the current position $P_r$.

Therefore, in the seek mode being separated as the search mode and transition mode, the control of velocity is executed by a control input u, from the target velocity $V_{TBL}$ and real velocity $V_r$. That is, the control input u is given by the following equation (3) and the input current is thereafter applied to the VCM;

$$u = K[V_{TBL} - V_r] \quad (3)$$

In equation (3), K represents a proportional constant of the control system. Then, when the head reaches the target position $P_f$, the executing mode is changed to the track following mode.

The track following mode obtains the PES from the A and B bursts and executes the position control which renders the head to be settled on the target track. Here, in case of commonly used PID controller, the control input u is newly determined by the following equation (4):

$$u = -K_p P_r - K_v V_r \quad (4)$$

In equation (4), $K_p$ represents a position control constant, and $K_v$ represents a velocity control constant.

The conventional servo control apparatus as discussed above however, has the following problems which should be cleared.

The real velocity $V_r$ is calculated by the following equation (5):

$$V_r(K) = \frac{P_r(k) - P_r(k-1)}{T_s} \quad (5)$$

In equation (5), $T_s$ represents a sampling interval. The value calculated by the equation (5), however, many errors arise in case where $T_s$ is more and more narrow and the real position $P_r$ is drastically changed. Thus, there is a problem that the VCM lies in an unexpected abnormal movement in the search mode and transition mode. Further, the track following mode using a full state feedback which is constructed as position information (a number of track, PES) and velocity information $V_r$ having expectable errors, has great difficulties in obtaining the complete control performance due to instability of the velocity information $V_r$. Actually, it is possible that a steady state error has occurred in the track following mode because there is no method for directly removing an external disturbance. Such an error is capable of being indirectly controlled using an integral controller, but is not capable of being controlled in the whole range of data on the recording media, so that the error is not clearly removed.

Figure 4:
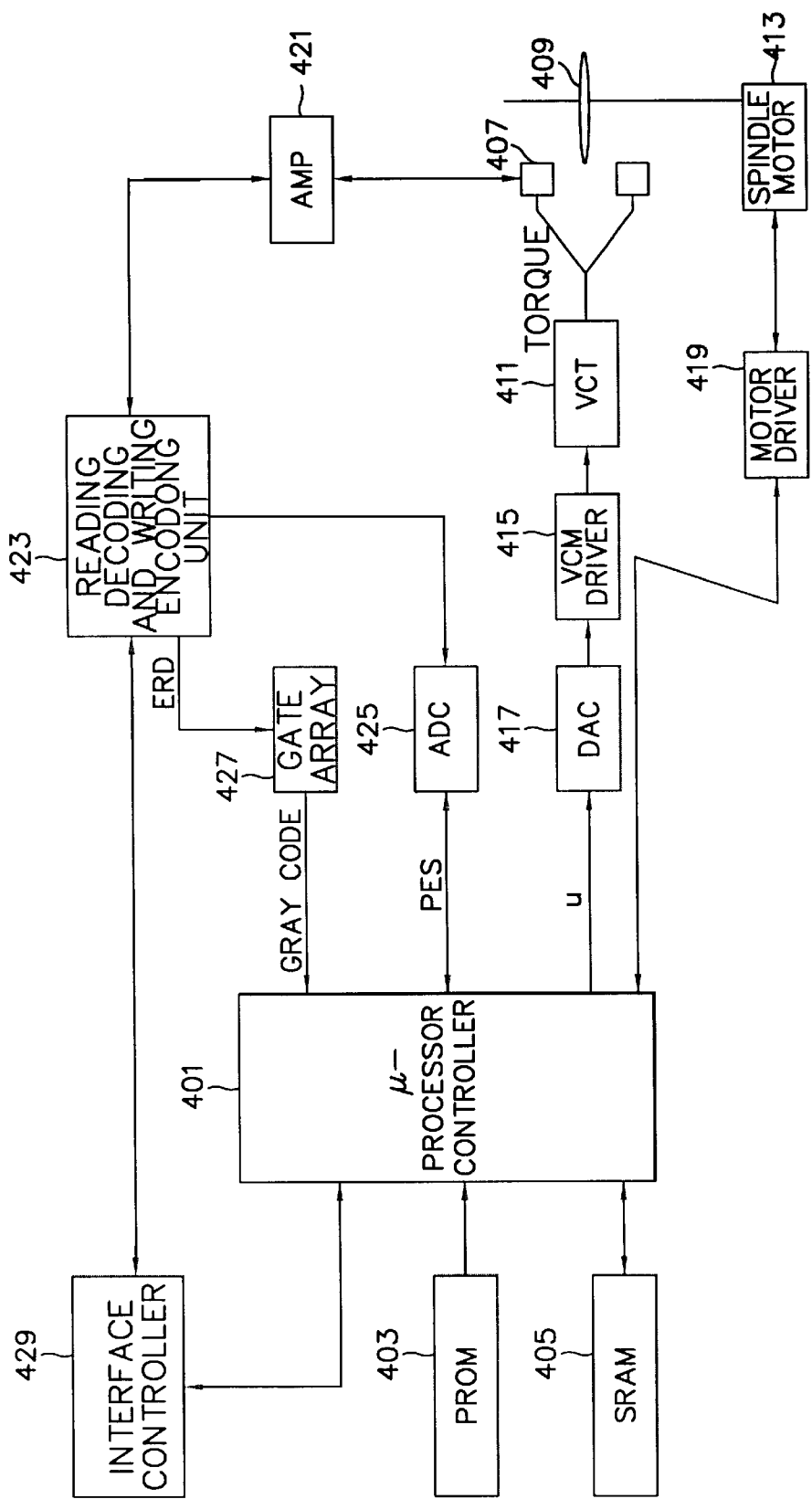
FIG. 4 is a block diagram showing a data storage system using disk recording media constructed according to the principles of the present invention.

FIG. 4 is a block diagram showing a data storage system using disk recording media according to an embodiment of the present invention. In the construction, the microprocessor 401 is respectively connected to a programmable read only memory 403 (hereinafter, PROM) which stores a preset control program and a prediction estimator algorithm of the microprocessor 401 and to a static random access memory 405 (hereinafter, SRAM). A head 407 performs a horizontal movement on a disk 409 as recording media and reads/writes data on the disk 409. A VCM 411 serves as an actuator and is connected to the head 407 to thereby activate the head 407 in the horizontal direction on the disk 409. A spindle motor 413 serves as a rotating actuator, of which the activating axis is connected to the disk 409, thus rotating the disk 409. A VCM driver 415 is connected to the VCM 411 and controls the activation thereof.

A DAC (digital/analog converter) 417 is respectively connected to the microprocessor 401 and the VCM driver 415. The DAC 417 receives a digital control input signal u from the microprocessor 401 and converts the signal into an analog signal to provide an analog-converted signal to the VCM driver 415. A motor driver 419 is respectively connected to the spindle motor 413 and to the microprocessor 401, and under the control of the microprocessor 401, controls the activation of the spindle motor 413. An amplifier 421 is connected to the head 407, amplifies a signal read by the head 401, and outputs the amplified signal. Additionally, the amplifier 421 amplifies an input signal to be written and outputs the amplified input signal to the head 407. An interface controller 429 is under the microprocessor 401, and receives and transmits data together with an external data input device (not shown). A reading decoding and writing encoding unit 423 is connected to the microprocessor 401, amplifier 421, and interface controller 429, respectively. Under the control of the microprocessor 401, the reading decoding and writing encoding unit 423 receives writing data from the interface controller 429 and encodes the data to an analog flux conversion signal, thereby outputting the signal to the amplifier 421. The microprocessor 401 converts the analog reading signal received from the amplifier 421 into a digital reading signal and outputs the digital signal as an encoded read data (hereafter, ERD).

An ADC (analog/digital converter) 425 is connected to the reading decoding and writing encoding unit 423, from which the ADC 425 receives an analog servo reading signal to convert the analog servo reading signal to the position error signal PES, thus outputting the PES to the microprocessor 401. A gate array 427 is connected to the reading decoding and writing encoding unit 423 and receives the ERD signal, from which the gate array 427 detects and outputs servo information such as gray codes.

In the construction as mentioned above, the microprocessor 401 loads the prediction estimator algorithm and the predetermined control program, received from the PROM 403, into its own interior and executes the overall control operation in the digital servo control apparatus.

Figure 5:
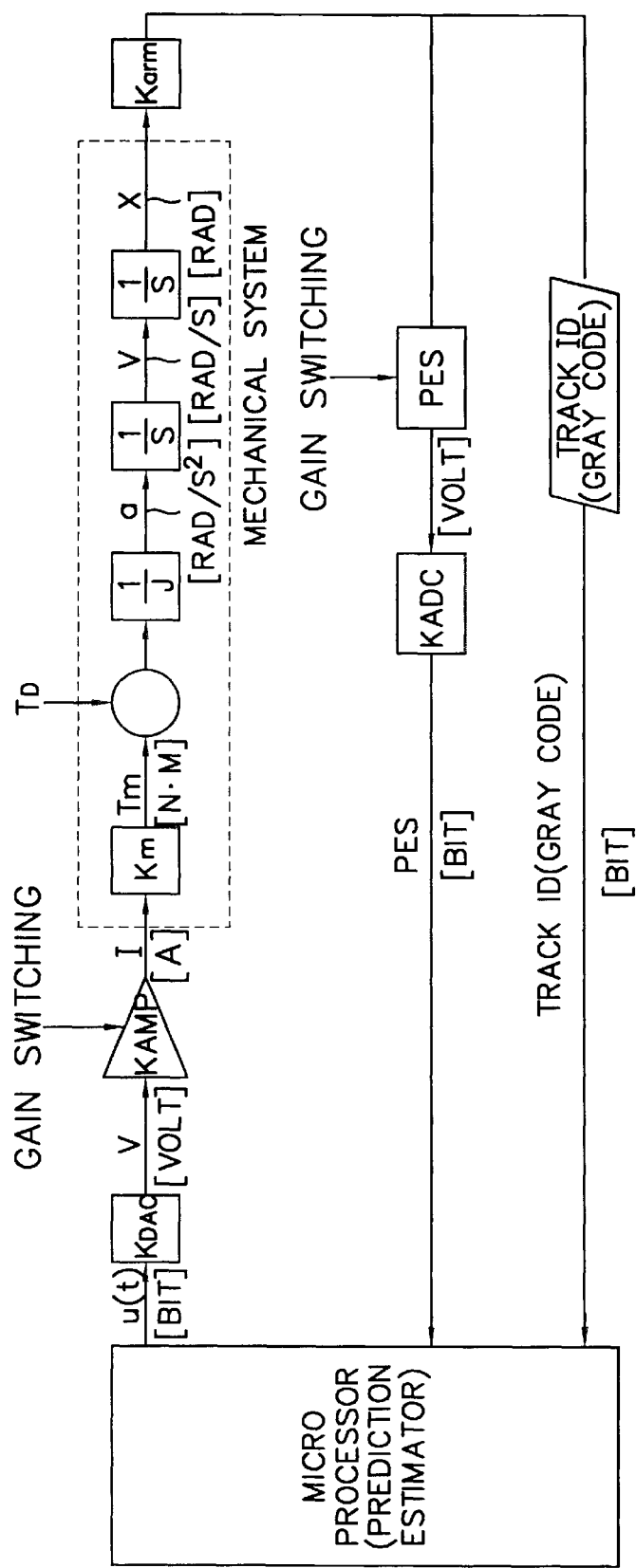
FIG. 5 is a block diagram showing a digital servo system according to an embodiment of the present invention.

FIG. 5 is a block diagram showing a digital servo system according to an embodiment of the present invention. Here, a prediction estimator in the form of an algorithm is stored into the microprocessor 401. This prediction estimator is as a kind of known art, disclosed in "digital is control of dynamic system (2nd edition)", written by G. F. Franklin, et al.

p Referring to FIG. 5, $K_{DAC}$ represents a digital/analog converter, $K_{ADC}$ analog/digital converter, $K_{amp}$ power amplifier transconductance, Km VCM torque constant, $T_m$ torque output from VCM actuator, $T_D$ exterior disturbance, J swing arm's moment of inertia, a [RAD/S$^2$] actuator angular velocity, V [RAD/S] actuator angular velocity, X [RAD] actuator angular displacement, and $K_{arm}$ swing arm kinematics. Here, both $T_m$ and $T_D$ are applied to an adder. FIG. 5 functions to convert an angular displacement to a linear displacement. At this time, the linear displacement of the head is predicted as a track number or the PES.

Here, the track number is indicated as a gray code and means an absolute position on the disk. The analog track number recorded in a servo pattern on the disk is converted into ERD via the reading decoding and writing encoding unit 423, and then the ERD is decoded to the gray code via the gate array 427. The microprocessor 401 receives the gray code as the track number.

Figure 6:
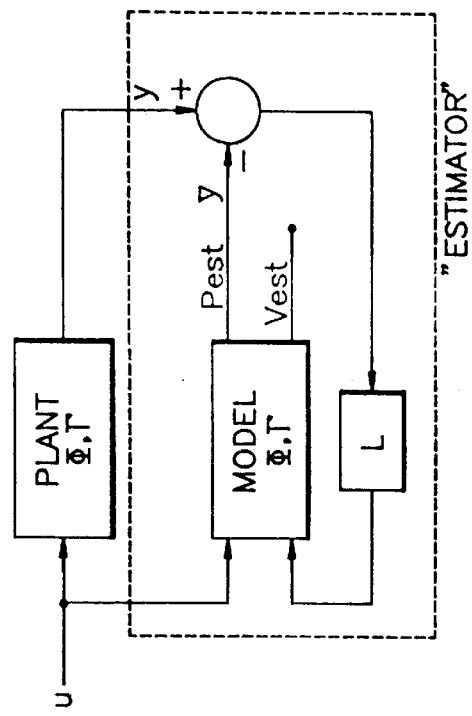
FIG. 6 is a block diagram showing a construction of an estimator according to an embodiment of the present invention.

FIG. 6 is a block diagram showing a construction of an estimator according to an embodiment of the present invention.

Figure 7:
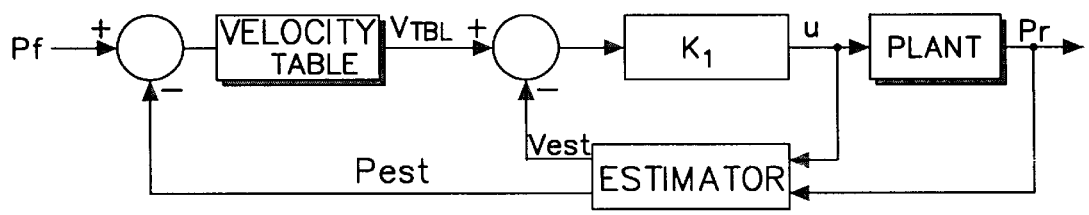
FIG. 7 is a block diagram showing a digital servo system during a search mode and transition mode according to an embodiment of the present invention.

FIG. 7 is a block diagram showing digital servo control during a search mode and transition mode according to an embodiment of the present invention.

Figure 8:
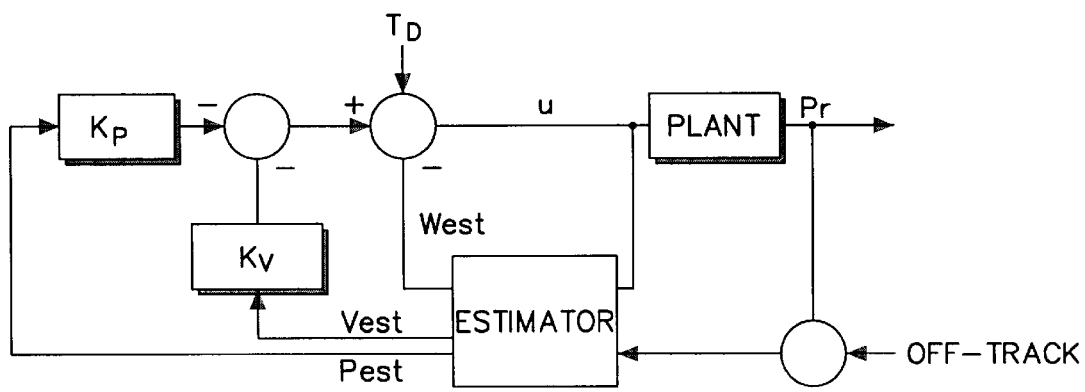
FIG. 8 is a block diagram showing a digital servo system during a track following mode according to an embodiment of the present invention.

FIG. 8 is a block diagram showing digital servo control during a track following mode according to an embodiment of the present invention.

Referring to FIGS. 6 to 8, $P_{est}$ represents estimated position information calculated by the estimator, $V_{est}$ estimated velocity information calculated by the estimator, $W_{est}$ estimated bias force calculated by the estimator, $V_{TBL}$ target velocity value in a velocity curve (in the look up table), K controller gain, L estimator gain, X real state variable vector, $\overline{X}$ estimation state variable vector, y output vector of plant, $\overline{y}$ estimation output vector of model, and $T_D$ external disturbance.

Figure 9:
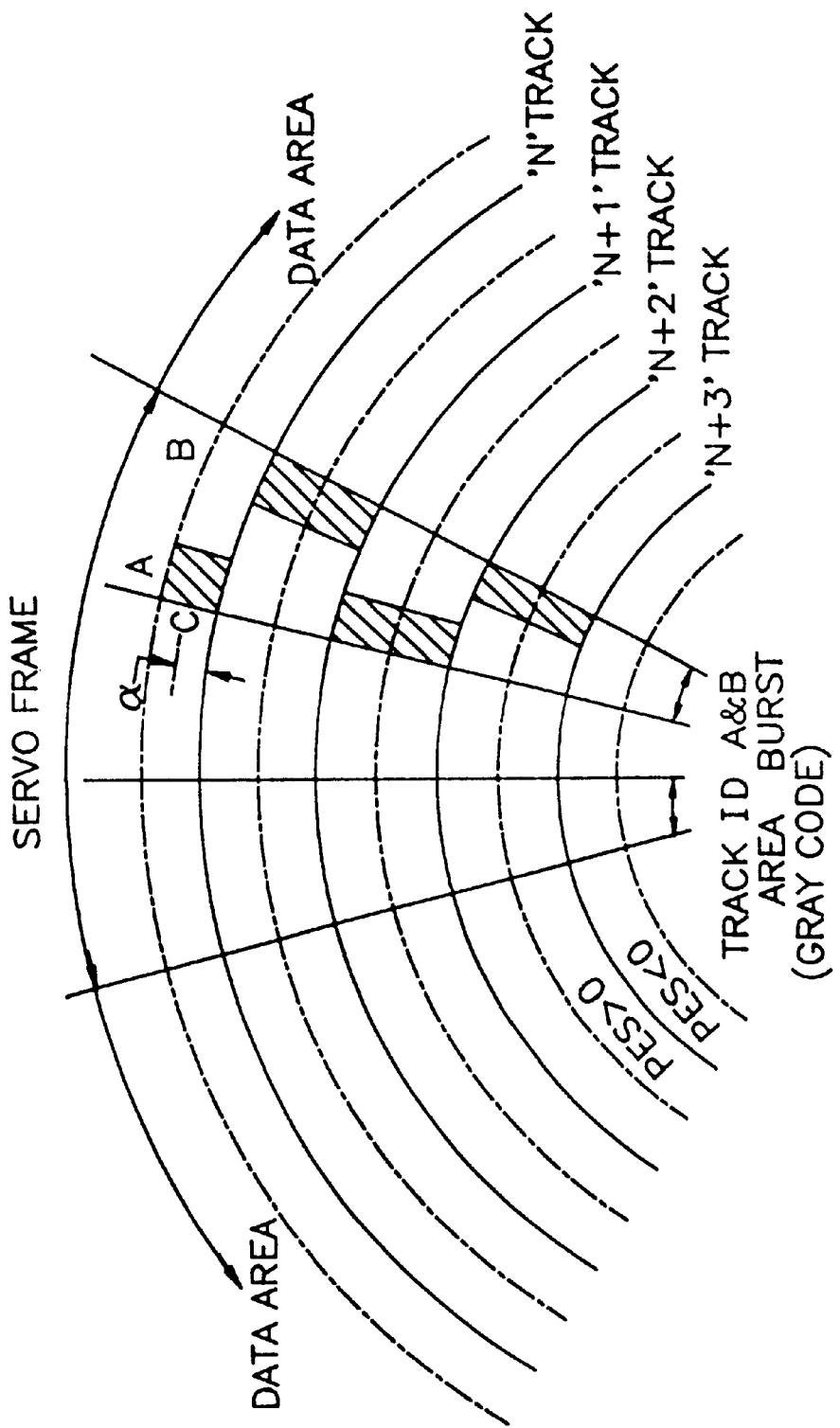
FIG. 9 is a schematic view showing tracks on a recording media of a HDD and A and B bursts according to an embodiment of the present invention.

FIG. 9 is a schematic view of a servo frame showing tracks on recording media of an HDD and A and B bursts according to an embodiment of the present invention.

Figure 10:
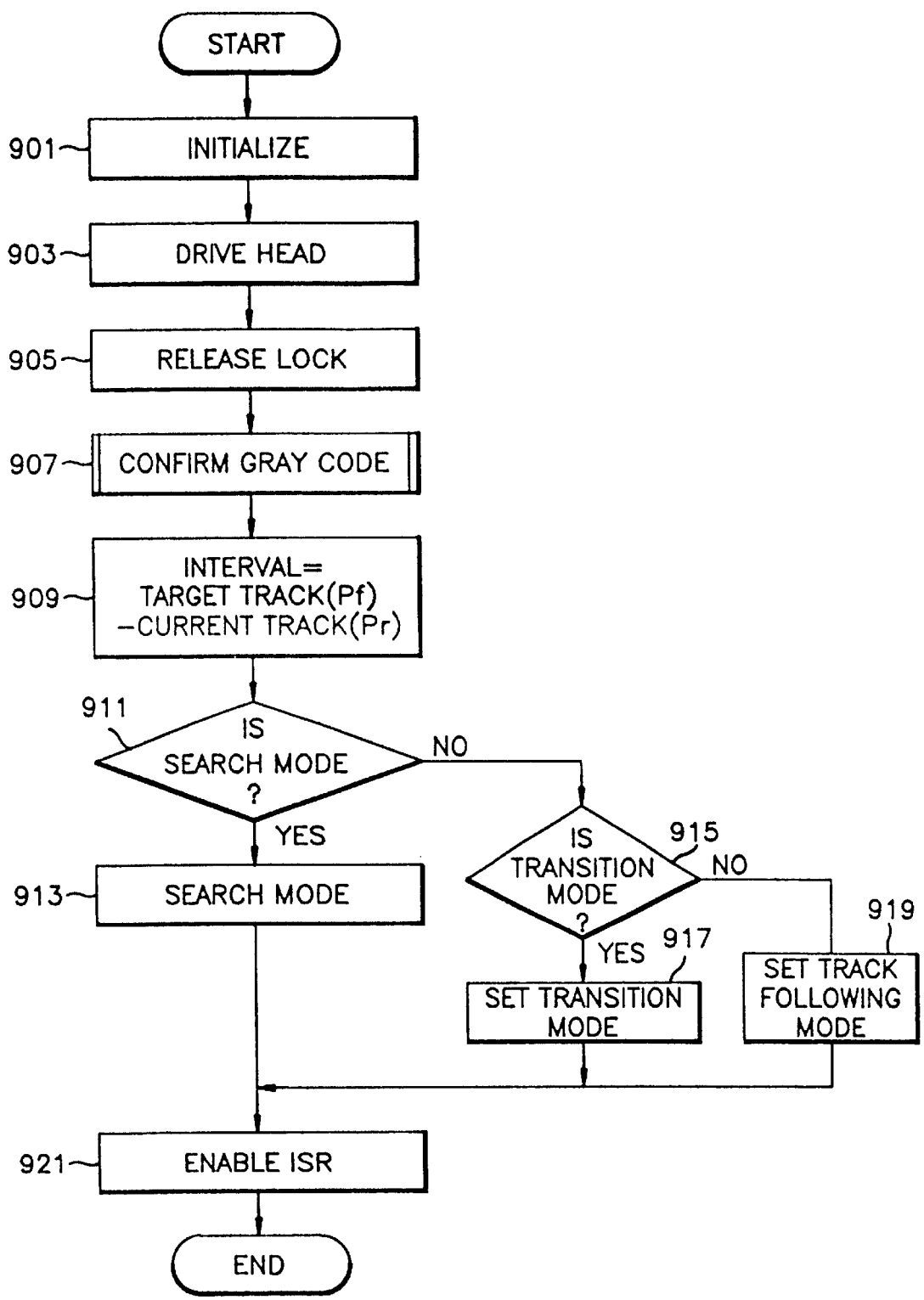
FIG. 10 is a main flow chart showing a control process according to an embodiment of the present invention.

FIG. 10 is a main flow chart showing a control process according to an embodiment of the present invention.

Figure 11:
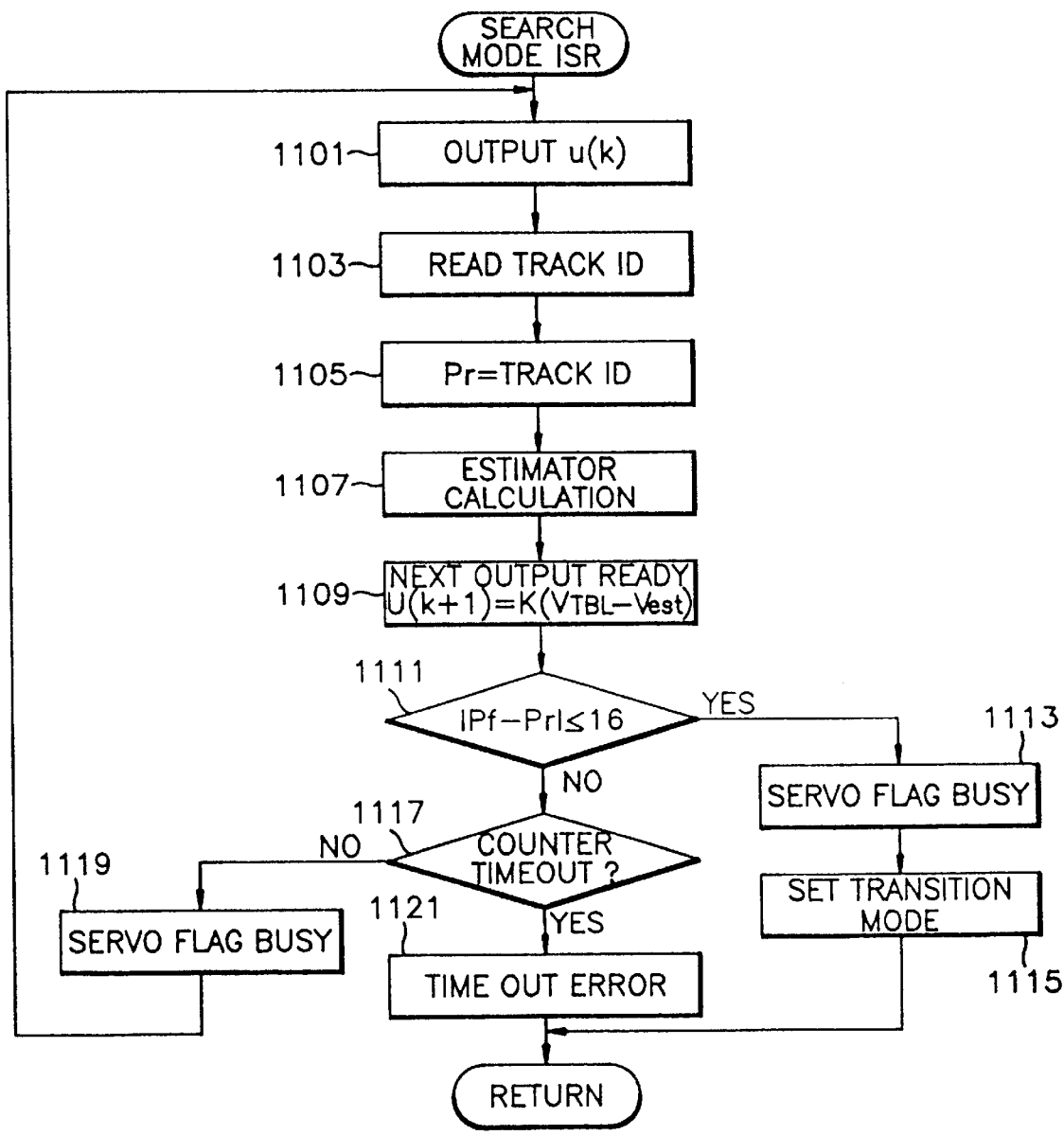
FIG. 11 is a flow chart showing a search mode ISR (interrupt service routine) of FIG. 10.

FIG. 11 is a flow chart showing a search mode ISR (interrupt service routine) of FIG. 10.

Figure 12:
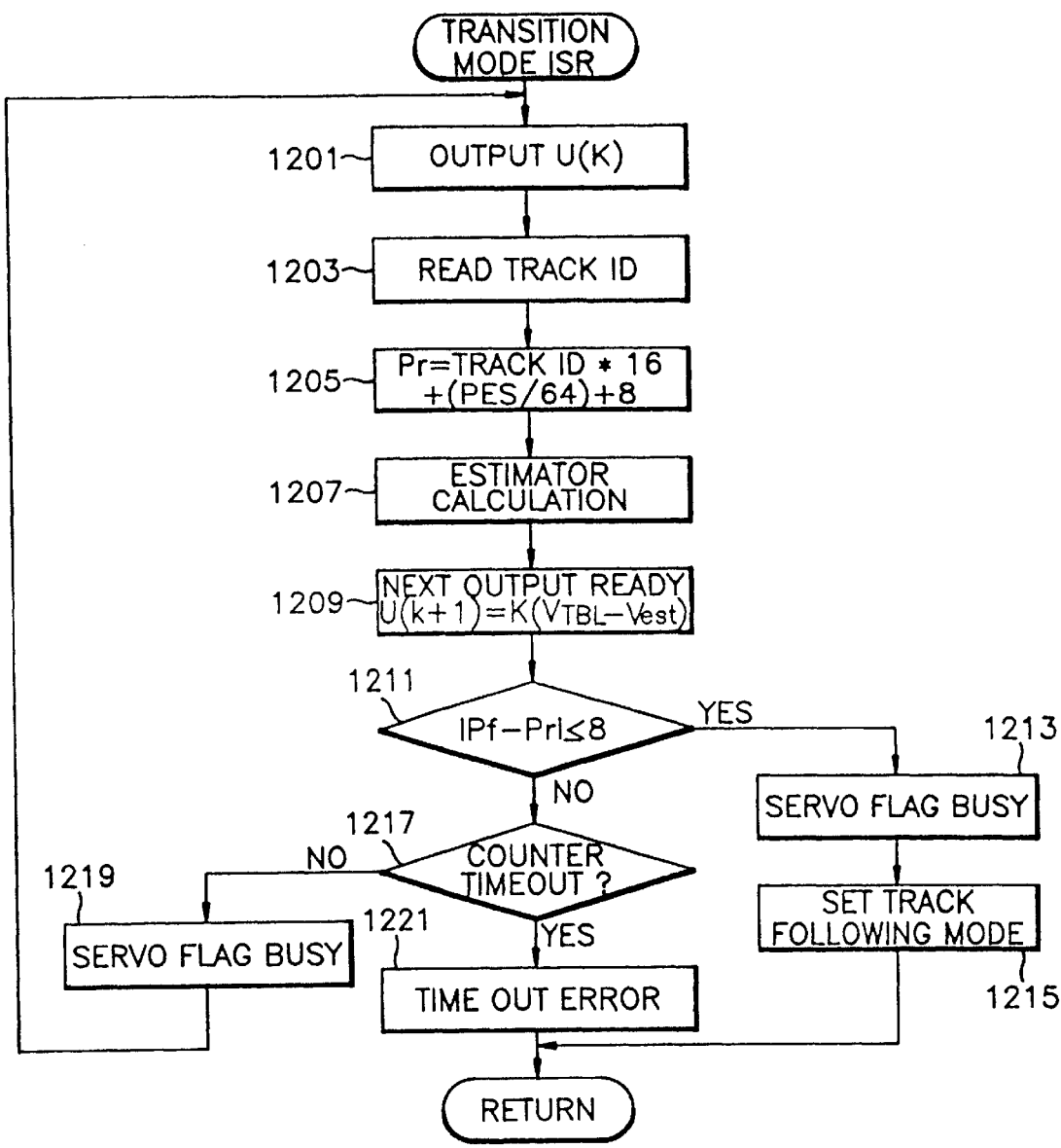
FIG. 12 is a flow chart showing a transition mode ISR of FIG. 10.

FIG. 12 is a flow chart showing a transition mode ISR of FIG. 10.

Figure 13:
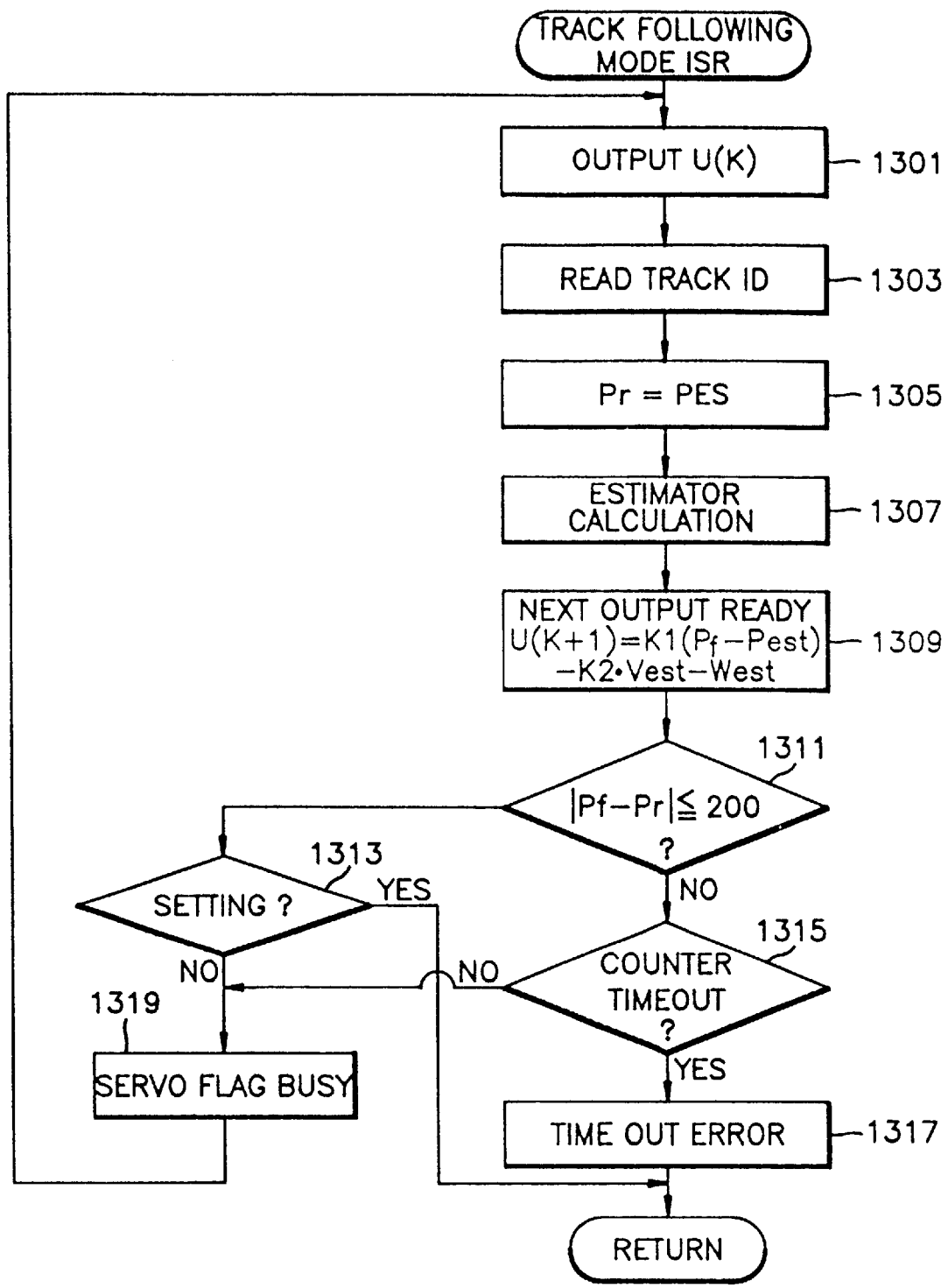
FIG. 13 is a flow chart showing a track following mode ISR of FIG. 10.

FIG. 13 is a flow chart showing a track following mode ISR of FIG. 10.

Explanation on a digital servo control apparatus and method in data storage system using disk recording media according to an embodiment of the present invention will be in detail described hereinafter with reference to FIGS. 5 to 13.

Firstly, of the digital servo control system in data storage system using the disk recording media, a model of a plant can be given as a kind of state equation by the following equation (6):

$$X(k+1) = \Phi X(k) + \Gamma u(k) \tag{6}$$

In this case, the $\Phi$ and $\Gamma$ represent matrixes for indicating plant gains, X(k) represents real state variable vector as indicated by the following equation (6-1):

$$X(k) = \begin{bmatrix} P_r \\ V_r \end{bmatrix} \tag{6-1}$$

Here, $P_r$ represents a real position, and $V_r$ represents a real velocity.

In the preferred embodiment of the present invention, to reduce the estimation error of the real velocity $V_r$, the estimation velocity $V_{est}$ is obtained by using a prediction estimator. As a result, the prediction estimator shown in FIG. 6 can be obtained by the following equations (7) and (8):

$$\overline{X}(k+1) = \phi \overline{X}(k) + \Gamma u(k) + L[y(k) - \overline{y}(k)] \tag{7}$$

$$\overline{X}(k) = \begin{bmatrix} P_{est} \\ V_{est} \end{bmatrix} \tag{8}$$

In this case, $P_{est}$ represents the estimated value of the real position $P_r$, and $V_{est}$ represents the estimated value of the real velocity $V_r$. In the equations (7) and (8), the output vector [y(k), $\overline{y}$(k)] of the plant and model becomes [$P_r$(k), $P_{est}$(k)]. L represents a feedback gain matrix of the prediction estimator.

It is understood that information on the estimated position $P_{est}$ and on the estimated velocity $V_{est}$ in FIG. 6 are obtained through the estimator, with information of the real position $P_r$ estimated from the plant.

In addition, in the preferred embodiment of the present invention, to directly remove the external disturbance, a bias estimation is used. Assuming that the external disturbance W is only a given constant, in case of applying a bias model, the state equation is given by the equations (9) and (10):

$$\overline{X}(k+1) = \phi_w \overline{X}(k) + \Gamma_w u(k) \tag{9}$$

here, $$\overline{X}(k) = \begin{bmatrix} P_{est} \\ V_{est} \\ W_{est} \end{bmatrix} \tag{10}$$

In the equation (10), $W_{est}$ represents estimated bias value. $\phi$ and $\Gamma$ of the equations (6) and (7) do not correspond to $\phi_w$ and $\Gamma_w$ of the equation (9), since construction of the estimation state variable vector $\overline{X}$(k) are different from each other as indicated in the equations (8) and (10). The bias estimation as the equation (9) is applied only in the track following mode.

Further, in the preferred embodiment of the present invention, both the number of track by a conventional gray code and position error signal PES using A and B bursts are applied for the purpose of raising control resolution of the transition mode. This is indicated by the following Table <1> showing the position information corresponding to the seek mode. Also, the Table <1> illustrates state of the control system according to control modes of FIGS. 7 and 8.

TABLE 1

| | Mode | | |
| --- | --- | --- | --- |
| Class | Search | Transition | Track Following |
| Control state | Velocity control | Velocity control | Position control |
| Deceleration Velocity Curve | First Deceleration Phase | Second Deceleration Phase | Non-existence |
| Estimation State Variable $\overline{X}$ | $\overline{X} = \begin{bmatrix} P_{est} \\ V_{est} \end{bmatrix}$ | $\overline{X} = \begin{bmatrix} P_{est} \\ V_{est} \end{bmatrix}$ | $\overline{X} = \begin{bmatrix} P_{est} \\ V_{est} \\ W_{est} \end{bmatrix}$ |
| Measurement | Gray Code | Gray Code and | PES (A and B Burst) |

TABLE 1-continued

| | Mode | | |
|---|---|---|---|
| Class | Search | Transition | Track Following |
| Position Information | PES | | |
| Control Equation | u = K₁[V_TBL − V_est] | Identical to Search Mode | u = [−K_pP_est − K_vV_est − W_est] |
| Prediction Estimator | Search and Transition Mode $\overline{X}(k+1) = \phi\overline{X}(k) + \Gamma u(k) + L_s[y(k) - \overline{y}(k)]$ | | |
| | Track Following Mode $\overline{X}(k+1) = \phi_\omega\overline{X}(k) + \Gamma_\omega u(k) + L_T[y(k) - \overline{y}(k)]$ | | |

In the Table <1>, the gain which should be determined in designing a servo control, becomes the controller gain K and estimator gain L. Accordingly, the gains are arranged in accordance with the search and transition modes and the track following mode, as indicated by the following equations (11) to (14).

Search and transition mode $$K = K_1 \quad (11)$$

$$L_s = \begin{bmatrix} L_1 \\ L_2 \end{bmatrix} \quad (12)$$

Track following mode $$K = [K_p \ K_v] \quad (13)$$

$$L_T = \begin{bmatrix} L_1 \\ L_2 \\ L_3 \end{bmatrix} \quad (14)$$

In the equations (11) to (14), k and L matrix values are determined by the application of a known pole-placement method, which method considers a damping coefficient and settling time from a secondary model.

According to the preferred embodiment of the present invention, so as to improve the control capability of the transition mode, good velocity control is achieved not by using the track position information by the conventional gray code, but is achieved by both the track position information and position error signal PES.

The method for calculating the current track position $P_r$ in accordance with each mode, is given by the following Table <2>.

TABLE 2

| Mode | Position Unit | Resolution per Track | Measurement Variable |
|---|---|---|---|
| Search | Track | 1 | Gray Code |
| Transition | Tran-Unit | 16 | Gray Code and PES |
| Track Following | PES | 1024 | PES |

During the search mode, when the moving distance |P_f−P_r| is within sixteen tracks, the search mode is changed to the transition mode. Thereafter, when the moving distance |P_f−P_r| reaches the range of the target position P_f, that is of eight tran-units, the transition mode is changed to the track following mode.

FIG. 9 is a schematic view of a servo frame showing tracks in an HDD and A and B bursts according to an embodiment of the present invention. An example of calculation of the tran-unit in the transition mode will be given hereinafter with reference to FIG. 9.

In the transition mode, one track is calculated at sixteen tran-units, and sixteen control resolution exists within one track by the PES. Firstly, it is assumed that the current position head has escaped the center of 'N' track to thereby be positioned on a point 'C', if the target position indicates 'N+3' track, the real moving distance of the head corresponds to three tracks, but in view of the tran-unit, the real moving distance of head corresponds to (three tracks× sixteen tran-units)+α. Here, the position at the point 'C' of the 'N' track is determined by the PES.

In the track following mode, one track is calculated at +512 to −511 PES (1024 resolution). Accordingly, tran-unit within one track is calculated from dividing the PES into 64. If the position error signal has 256 resolution in the point 'C' where the head is positioned, α corresponds to 4 which is obtained by dividing 256 by 64. As a result, in the transition mode of FIG. 9, the head position to be moved becomes 52 tran-units by adding 4 to 48.

The velocity curve of the transition mode (in the second deceleration phase of FIG. 2) is comprised of the moving distance corresponding to 256 resolution which is equal to 16 tracks times 16 tran-units. In FIG. 9, 52 tran-units corresponds to 3.25 tracks, therefore 3.25 tracks times 16 tran-units results in a velocity corresponding to 52 moving distances and is defined as the target velocity, thereby executing a velocity control operation.

The look-up table is comprised of the deceleration profile in the search mode and transition mode, and of $K_d$ (forward system gain), K (controller gain), and L (estimator gain) requisite for the search, transition, and track following modes.

The deceleration profile during the search mode is applied from 250 tracks prior to the target track, and the deceleration profile during the transition mode is applied from 16 tracks prior to the target track. Each deceleration profile is given by adjusting the exponent α of the following equation (15):

$$V = K \cdot X^\alpha \quad (15)$$

In the equation (15), V represents target velocity, X target moving distance, and K proportional constant. The K is defined depending upon the acceleration capability of the VCM. In the preferred embodiment of the present invention, a value in the search mode is 0.8, and α value in the transition mode is 0.85, respectively. Of course, the unit of the target moving distance X corresponds to the track in the search mode, and to the tran-unit in the transition mode.

The gains discussed above are in the different state, since the overall operating range of head is divided into six operating points. The forward system gain $K_d$ would be given by the equation (16):

$$K_d = \frac{K_{DAC} \cdot K_{amp} \cdot K_m \cdot K_{arm}}{J} \quad (16)$$

In the equation (16), the gain $K_d$ is shown in a continuous system. When real simulation operates, the gain corresponding to a digital system considering sampling time should be used. Further, in the equation (16), most changeable variable according to the operating point is referred to as $K_m$. Thus, to compensate the change of the $K_m$ (VCM torque constant), the gains are used at six areas divided in the look-up table, as discussed earlier.

An embodiment of the present invention in accordance with each flow chart will be in detail described with reference to FIGS. 4 to 8.

The microprocessor 401 executes an initial operation of a variable requisite for elements and codes of the VCM driver 415 and gate array 427, in step 901. Thereafter, the microprocessor 401 activates the head disposed in a parking zone when the HDD is stopped, in step 903. In that time, there is a problem that the head usually sticks to a parking zone, in case of a small-size of HDD, when the head is damaged. In an embodiment of the present invention, so as to solve the problem, the head has the step of being rocked, which step is well known to those skilled in the art, before the step of releasing the lock of head is executed. In other words, the head is rocked by repeatedly changing the polarity of appropriate minute electric current which is applied to the VCM, thereby overcoming the problem that the head sticks to the parking zone.

In step 905, after the spindle motor reaches a normal velocity (3600 RPM), the step of releasing the lock of head is executed for operating an actuator, which step means, at the early driving of driver, the actuator to which the head 407 is attached is moved from the parking zone to the position of track zero to prepare the head for a driving state.

Thereafter, in step 907, the microprocessor 401 receives the gray code of track inputted from the head 407 and then senses the current track $P_r$ where the head is positioned. In step 909, the microprocessor 401 calculates the interval between the target track $P_f$ and the current track $P_r$ sensed in the step 907 to thereby calculate the moving distance X up to the target track $P_f$.

The microprocessor 401 executes setting of each mode, for instance, the search mode, transition mode, and track following mode, corresponding to the moving distance X, through steps 911 to 919. Thereafter, in step 921, the microprocessor 401 executes an ISR (interrupt service routine) operation in accordance with the modes set in steps above.

In that time, before the ISR operation is executed, the gains of the controller and estimator are selected from the table in the mode setting step, for example, in steps 913, 917 and 919, and a scaling operation of state variable is executed, so that the preparation is made for the ISR operation. A bias calibration operation is performed as an example of preparing for the ISR operation. The bias calibration operation is a module being performed only one time prior to the preparation for the drive, which module is to compensate the external disturbance occurring in different mechanisms of every drive. In this case, if the difference of bias force is large, when the actuator runs forward and backward, the calibration on the bidirection is necessary.

The bias force calculated from the bias calibration is stored in a RAM and is used in the ISR operation. In response to an available memory capacitance of the RAM and respective characteristics of drive spin-up time, whether every how many track the bias force is calibrated is determined by an initial value in accordance with a reference characteristic. According to the preferred embodiment of the present invention, when the actuator runs only forward, the calibration of the bias force is executed every 128 tracks.

The ISR operation in step 921 according to the preferred embodiment of the present invention will be explained with reference to FIGS. 11 to 13.

Each ISR operation of FIG. 10 is performed every sampling time 231.5 $\mu s$, which is divided as a search mode ISR operation of FIG. 11, a transition mode ISR operation of FIG. 12, and a track following mode ISR operation of FIG. 13, respectively.

Referring to the search mode ISR operation of FIG. 11, in step 1101 the microprocessor 401 outputs a control input value u(k), calculated in the previous sampling phase (k−1), of the current sampling phase to thereby apply electric current to the VCM 411 through the DAC 417 and VCM driver 415. Thereafter, in step 1103 the microprocessor 401 reads current track identification through the head 407. In step 1105, the microprocessor 401 defines the current position $P_r$ from the current track identification and in step 1107, calculates estimation control from the current position $P_r$. Then, in step 1109 the microprocessor control 401 calculates a control input value u(k+1) for the next sampling phase.

If, in step 1111, it is checked that the moving distance $|P_f-P_r|$ is less than or equal to 16 tracks, the microprocessor 401 registers a servo flag busy state in step 1113 and thereafter, in step 1115, executes the setting for the transition mode. Then the microprocessor 401 is returned to the main routine of FIG. 10 to execute the Transistion mode ISR operation. In the step 1111, if it is, however, checked that the moving distance $|P_f-P_r|$ is over 16 tracks, the microprocessor 401 executes a counting operation to thereby determine that a counter time is out in step 1117. Here, if the counter time is out, the microprocessor 401 registers a counter time out error and completes the search mode ISR operation. Further, in the step 1117, if the counter time is not out, the microprocessor 401 registers the servo flag busy state and continues to execute the search mode ISR operation.

Referring to the transition mode ISR operation of FIG. 12, in step 1201 the microprocessor 401 outputs a control input value u(k), calculated in the previous sampling phase (k−1), of the current sampling phase to thereby apply electric current to the VCM 411 through the DAC 417 and VCM driver 415. Thereafter, in step 1203 the microprocessor 401 reads current track identification through the head 407. In step 1205, the microprocessor 401 defines the current position $P_r$, after the tran-unit is determined from the current track identification and in step 1207, calculates estimation control from the current position $P_r$. Then, in step 1209 the microprocessor control 401 calculates a control input value u(k+1) for the next sampling phase.

If, in step 1211, it is checked that the moving distance $|P_f-P_r|$ is less than or equal to 8 tran-units, the microprocessor 401 registers a servo flag busy state in step 1213 and thereafter, in step 1215, executes the setting for the track following mode. Then the microprocessor 401 is returned to the step 921 of FIG. 10 to execute the track following mode ISR operation. In the step 1211, if it is, however, checked that the moving distance $|P_f-P_r|$ is over 8 tran-units, the microprocessor 401 executes a counting operation to thereby determine that a counter time is out in step 1217. Here, if the counter time is out, the microprocessor 401 registers a counter time out error and completes the transition mode ISR operation. Further, in the step 1217, if the counter time is not out, the microprocessor 401 registers the servo flag busy state and continues to execute the transition mode ISR operation.

Referring to the track following mode ISR operation of FIG. 13, in step 1301 the microprocessor 401 outputs a control input value u(k), calculated in the previous sampling phase (k−1), of the current sampling phase to thereby apply electric current to the VCM 411 through the DAC 417 and VCM driver 415. Thereafter, in step 1303 the microprocessor 401 reads current track identification through the head 407. In step 1305, the microprocessor 401 defines the current position $P_r$, after the position error signal PES is determined from the current track identification and in step 1307, calculates estimation control from the current position $P_r$. Then, in step 1309 the microprocessor control 401 calculates a control input value u(k+1) for the next sampling phase.

If, in step 1311, it is checked that the moving distance |P$_f$-P$_r$| is less than or equal to 200 PES, the microprocessor 401 executes a settling operation in step 1313 to determine whether the settling operation is completed.

In the track following mode according to the preferred embodiment of the present invention, the settling operation is determined as 200 PES (which represents an amount of off-track of 20%). On reading and writing operations, the condition of the settling operation may be different from as mentioned above. That is, on writing operation, if the amount of off-track of 20% is maintained during 16 sampling time (3.7 ms), the settling operation is completed and data is written on the real disk. On the other hand, on reading operation, if the amount of off-track of 20% is maintained during 4 sampling time (0.93 ms), the settling operation is completed and data is read from the real disk. Thereafter, if, in the step 1313, it is determined that the settling operation is completed the microprocessor 401 terminates the track following mode ISR operation and is returned to the main routine to thereby complete the main routine. In the step 1311, if it is, however, checked that the moving distance |P$_f$-P$_r$| is over 200 PES, the microprocessor 401 executes a counting operation to thereby determine that a counter time is out in step 1315. Here, if the counter time is out, the microprocessor 401 registers a counter time out error and completes the track following mode ISR operation. Further, in the step 1315, if the counter time is not out, the microprocessor 401 registers the servo flag busy state and continues to execute the track following mode ISR operation.

In the processes mentioned above, the servo flag is used with 8 bits and indicates the completion of settling operation, error state of the gate array 427, and the servo error state, on reading and writing operations, which is used in an interface code between the HDD and host.

As discussed above, this invention is advantageous in such ways as preventing errors occurring in a conventional analog control device or analog and digital mixing control device by using a pure digital servo control apparatus in which the position of head for recording and reading data, is controlled, and making the change of products only with the correction of a control gain and control step, since this invention is directed to a pure digital control system using a software.

Further, the present invention is advantageous in such ways as easily controlling a voice coil motor by accurately estimating the velocity variable of head with an estimator, and removing a normal state error occurring by an external disturbance by using a bias estimation. In addition, the present invention is advantageous in such ways as executing an accurate velocity control when compared with a conventional velocity control to thereby stabilize a settling operation during a track following mode, by performing the velocity control with both a position error signal PES and a conventional gray code in a transition mode of a seek mode being converted into the track following mode.

What is claimed is:

1. A digital servo control method for controlling a voice coil motor for moving a head to a target track for every predetermined sampling period in a data storage system using disk recording media, said method comprising the steps of:

reading track position information for detecting a gray code of a current track on said disk recording media to derive a track position of said head;

selecting a target track for determining a moving distance for moving said head from said track position to said target track;

selecting one of a search mode, a transition mode and a track following mode as a result of said moving distance; and enabling one of a search mode interrupt service routine, a transition mode interrupt service routine and a track following mode interrupt service routine for applying a control signal to said voice coil motor according to the selected one of said search mode, transition mode and track following mode for controlling the velocity of said head for traversing said moving distance, said search mode interrupt service routine comprising the steps of:

generating a first control signal for moving said head;

reading track identification data in response to movement of said head to determine a current track position;

deriving a target velocity from a look-up table according to said moving distance;

determining a difference between a position of said target track and said current track position for generating an estimated velocity based on said difference;

generating a reduced velocity by reducing said target velocity by an amount equal to said estimated velocity and increasing said reduced velocity by a predetermined gain for generating a new control signal;

determining whether said difference between said target track position and said current track position is less than or equal to a predetermined number of tracks; and performing said transition mode interrupt service routine when said difference between said target track position and said current track position is less than or equal to said predetermined number of tracks.

2. The method as set forth in claim 1, further comprising the steps of:

performing a counting operation and determining whether said counting operation reaches a predetermined count when said difference between said target track position and said current track position is greater than said predetermined number of tracks;

outputting said new control signal as said first control signal for moving said head and returning to said step of reading track identification data when said counting operation has not reached said predetermined count; and ending said search mode interrupt service routine when said counting operation has reached said predetermined count.

3. The method as set forth in claim 1, said transition mode interrupt service routine comprising the steps of:

generating a first control signal for moving said head;

reading track identification data in response to movement of said head and generating a position error signal from said track identification data;

using said position error signal and said gray code to determine a current track position;

deriving a target velocity from a look-up table according to said moving distance;

determining a difference between a position of said target track and said current track position for generating an estimated velocity based on said difference;

reducing said target velocity by an amount equal to said estimated velocity and applying a predetermined gain to the result to generate a new control signal;

determining whether said difference between said target track position and said current track position is less than or equal to a predetermined number of tran-units, with sixteen tran-units being equal to one track; and performing said track following mode interrupt service routine when said difference between said target track position and said current track position is less than or equal to said predetermined number of tran-units.

4. The method as set forth in claim 3, further comprising the steps of:

performing a counting operation and determining whether said counting operation reaches a predetermined count when said difference between said target track position and said current track position is greater than said predetermined number of tran-units;

outputting said new control signal as said first control signal for moving said head and returning to said step of reading track identification data when said counting operation has not reached said predetermined count; and ending said transition mode interrupt service routine when said counting operation has reached said predetermined count.

5. The method as set forth in claim 1, said track following mode interrupt service routine comprising the steps of:

generating a first control signal for moving said head;

reading track identification data in response to movement of said head and generating a position error signal from said track identification data;

using said position error signal to determine an estimated current track position, an estimated velocity and a bias estimate;

applying a first gain to said estimated current track position to obtain a first result;

applying a second gain to said estimated velocity to obtain a second result;

generating a new control signal by combining said first result with said second result to obtain a third result and combining said bias estimate with said third result to remove any influence due to external disturbances on said head;

determining whether a difference between said target track position and said current track position is less than or equal to a predetermined position error signal value, wherein a position error signal value of 1024 is equal to one track; and performing a settling operation when said difference between said target track position and said current track position is less than or equal to said predetermined position error signal value.

6. The method as set forth in claim 5, further comprising the steps of:

performing a counting operation and determining whether said counting operation reaches a predetermined count when said difference between said target track position and said current track position is greater than said predetermined position error signal value;

outputting said new control signal as said first control signal for moving said head and returning to said step of reading track identification data when said counting operation has not reached said predetermined count; and ending said track following mode interrupt service routine when said counting operation has reached said predetermined count.

7. A digital servo control method for controlling a voice coil motor for moving a head to a target track for every predetermined sampling period in a data storage system using disk recording media, said method comprising the steps of:

reading track position information for detecting a gray code of a current track on said disk recording media to derive a track position of said head;

selecting a target track for determining a moving distance for moving said head from said track position to said target track;

selecting one of a search mode, a transition mode and a track following mode as a result of said moving distance; and enabling one of a search mode interrupt service routine, a transition mode interrupt service routine and a track following mode interrupt service routine for applying a control signal to said voice coil motor according to the selected one of said search mode, transition mode and track following mode for controlling the velocity of said head for traversing said moving distance, said transition mode interrupt service routine comprising the steps of:

generating a first control signal for moving said head;

reading track identification data in response to movement of said head and generating a position error signal from said track identification data;

using said position error signal and said gray code to determine a current track position;

deriving a target velocity from a look-up table according to said moving distance;

determining a difference between a position of said target track and said current track position for generating an estimated velocity based on said difference;

reducing said target velocity by an amount equal to said estimated velocity and applying a predetermined gain to the result to generate a new control signal;

determining whether said difference between said target track position and said current track position is less than or equal to a predetermined number of tran-units, with sixteen tran-units being equal to one track; and performing said track following mode interrupt service routine when said difference between said target track position and said current track position is less than or equal to said predetermined number of tran-units.

8. The method as set forth in claim 7, further comprising the steps of:

performing a counting operation and determining whether said counting operation reaches a predetermined count when said difference between said target track position and said current track position is greater than said predetermined number of tran-units;

outputting said new control signal as said first control signal for moving said head and returning to said step of reading track identification data when said counting operation has not reached said predetermined count; and ending said transition mode interrupt service routine when said counting operation has reached said predetermined count.

9. The method as set forth in claim 7, said search mode interrupt service routine comprising the steps of:
    generating a first control signal for moving said head;
    reading track identification data in response to movement of said head to determine a current track position;
    deriving a target velocity from a look-up table according to said moving distance;
    determining a difference between a position of said target track and said current track position for generating an estimated velocity based on said difference;
    generating a reduced velocity by reducing said target velocity by an amount equal to said estimated velocity and increasing said reduced velocity by a predetermined gain for generating a new control signal;
    determining whether said difference between said target track position and said current track position is less than or equal to a predetermined number of tracks; and
    performing said transition mode interrupt service routine when said difference between said target track position and said current track position is less than or equal to said predetermined number of tracks.

10. The method as set forth in claim 9, further comprising the steps of:
    performing a counting operation and determining whether said counting operation reaches a predetermined count when said difference between said target track position and said current track position is greater than said predetermined number of tracks;
    outputting said new control signal as said first control signal for moving said head and returning to said step of reading track identification data when said counting operation has not reached said predetermined count; and
    ending said search mode interrupt service routine when said counting operation has reached said predetermined count.

11. The method as set forth in claim 7, said track following mode interrupt service routine comprising the steps of:
    generating a first control signal for moving said head;
    reading track identification data in response to movement of said head and generating a position error signal from said track identification data;
    using said position error signal to determine an estimated current track position, an estimated velocity and a bias estimate;
    applying a first gain to said estimated current track position to obtain a first result;
    applying a second gain to said estimated velocity to obtain a second result;
    generating a new control signal by combining said first result with said second result to obtain a third result and combining said bias estimate with said third result to remove any influence due to external disturbances on said head;
    determining whether a difference between said target track position and said current track position is less than or equal to a predetermined position error signal value, wherein a position error signal value of 1024 is equal to one track; and
    performing a settling operation when said difference between said target track position and said current track position is less than or equal to said predetermined position error signal value.

12. The method as set forth in claim 11, further comprising the steps of:
    performing a counting operation and determining whether said counting operation reaches a predetermined count when said difference between said target track position and said current track position is greater than said predetermined position error signal value;
    outputting said new control signal as said first control signal for moving said head and returning to said step of reading track identification data when said counting operation has not reached said predetermined count; and
    ending said track following mode interrupt service routine when said counting operation has reached said predetermined count.

13. A digital servo control method for controlling a voice coil motor for moving a head to a target track for every predetermined sampling period in a data storage system using disk recording media, said method comprising the steps of:
    reading track position information for detecting a gray code of a current track on said disk recording media to derive a track position of said head;
    selecting a target track for determining a moving distance for moving said head from said track position to said target track;
    selecting one of a search mode, a transition mode and a track following mode as a result of said moving distance; and
    enabling one of a search mode interrupt service routine, a transition mode interrupt service routine and a track following mode interrupt service routine for applying a control signal to said voice coil motor according to the selected one of said search mode, transition mode and track following mode for controlling the velocity of said head for traversing said moving distance, said track following mode interrupt service routine comprising the steps of:
        generating a first control signal for moving said head;
        reading track identification data in response to movement of said head and generating a position error signal from said track identification data;
        using said position error signal to determine an estimated current track position, an estimated velocity and a bias estimate;
        applying a first gain to said estimated current track position to obtain a first result;
        applying a second gain to said estimated velocity to obtain a second result;
        generating a new control signal by combining said first result with said second result to obtain a third result and combining said bias estimate with said third result to remove any influence due to external disturbances on said head;
        determining whether a difference between said target track position and said current track position is less than or equal to a predetermined position error signal value, wherein a position error signal value of 1024 is equal to one track; and
        performing a settling operation when said difference between said target track position and said current track position is less than or equal to said predetermined position error signal value.

14. The method as set forth in claim 13, further comprising the steps of:
    performing a counting operation and determining whether said counting operation reaches a predetermined count when said difference between said target track position and said current track position is greater than said predetermined position error signal value;

outputting said new control signal as said first control signal for moving said head and returning to said step of reading track identification data when said counting operation has not reached said predetermined count; and ending said track following mode interrupt service routine when said counting operation has reached said predetermined count.

15. The method as set forth in claim 13, said search mode interrupt service routine comprising the steps of:

generating a first control signal for moving said head;

reading track identification data in response to movement of said head to determine a current track position;

deriving a target velocity from a look-up table according to said moving distance;

determining a difference between a position of said target track and said current track position for generating an estimated velocity based on said difference;

generating a reduced velocity by reducing said target velocity by an amount equal to said estimated velocity and increasing said reduced velocity by a predetermined gain for generating a new control signal;

determining whether said difference between said target track position and said current track position is less than or equal to a predetermined number of tracks; and performing said transition mode interrupt service routine when said difference between said target track position and said current track position is less than or equal to said predetermined number of tracks.

16. The method as set forth in claim 15, further comprising the steps of:

performing a counting operation and determining whether said counting operation reaches a predetermined count when said difference between said target track position and said current track position is greater than said predetermined number of tracks;

outputting said new control signal as said first control signal for moving said head and returning to said step of reading track identification data when said counting operation has not reached said predetermined count; and ending said search mode interrupt service routine when said counting operation has reached said predetermined count.

17. The method as set forth in claim 13, said transition mode interrupt service routine comprising the steps of:

generating a first control signal for moving said head;

reading track identification data in response to movement of said head and generating a position error signal from said track identification data;

using said position error signal and said gray code to determine a current track position;

deriving a target velocity from a look-up table according to said moving distance;

determining a difference between a position of said target track and said current track position for generating an estimated velocity based on said difference;

reducing said target velocity by an amount equal to said estimated velocity and applying a predetermined gain to the result to generate a new control signal;

determining whether said difference between said target track position and said current track position is less than or equal to a predetermined number of tran-units, with sixteen tran-units being equal to one track; and performing said track following mode interrupt service routine when said difference between said target track position and said current track position is less than or equal to said predetermined number of tran-units.

18. The method as set forth in claim 17, further comprising the steps of:

performing a counting operation and determining whether said counting operation reaches a predetermined count when said difference between said target track position and said current track position is greater than said predetermined number of tran-units;

outputting said new control signal as said first control signal for moving said head and returning to said step of reading track identification data when said counting operation has not reached said predetermined count; and ending said transition mode interrupt service routine when said counting operation has reached said predetermined count.

* * * * *